(12) United States Patent
Aksit et al.

(10) Patent No.: US 6,406,027 B1
(45) Date of Patent: Jun. 18, 2002

(54) BRUSH SEAL AND MACHINE HAVING A BRUSH SEAL

(75) Inventors: Mahmut Faruk Aksit; Osman Saim Dinc, both of Troy; Robert Russell Mayer, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/505,805

(22) Filed: Feb. 17, 2000

Related U.S. Application Data

(60) Provisional application No. 60/145,049, filed on Jul. 22, 1999.

(51) Int. Cl.[7] ................................................. F16J 15/44
(52) U.S. Cl. ........................................................ 277/355
(58) Field of Search ........................................... 277/355

(56) References Cited

U.S. PATENT DOCUMENTS

| | | | |
|---|---|---|---|
| 4,352,034 A | * | 9/1982 | Karhan et al. |
| 4,415,309 A | * | 11/1983 | Atterbury |
| 4,497,172 A | * | 2/1985 | Smith |
| 4,600,202 A | * | 7/1986 | Schaeffler et al. |
| 4,678,113 A | * | 7/1987 | Bridges et al. |
| 4,733,225 A | * | 3/1988 | Uematsu et al. |
| 4,989,886 A | * | 2/1991 | Rulis |
| 5,135,237 A | * | 8/1992 | Flower |
| 5,316,318 A | * | 5/1994 | Veau |
| 5,425,543 A | * | 6/1995 | Buckshaw et al. |
| 5,613,829 A | | 3/1997 | Wolfe et al. .............. 415/174.1 |
| 5,678,898 A | | 10/1997 | Bagepalli et al. .............. 300/21 |
| 5,941,685 A | | 8/1999 | Bagepalli et al. ......... 415/173.3 |
| 5,961,125 A | | 10/1999 | Wolfe et al. ................. 277/355 |
| 5,961,280 A | | 10/1999 | Turnquist et al. ......... 415/173.3 |
| 5,975,535 A | * | 11/1999 | Gail et al. |

FOREIGN PATENT DOCUMENTS

JP        404272397 A  *  9/1992

OTHER PUBLICATIONS

"Jointly–filed" RD–27,290/USB, "Brush Seal Having Secured Bristles".
"Brush Seal and Rotary Machine Including Such Brush Seal", filing date Nov. 30, 1998,S.N. 09/201,008.
Dupont Multifiber Bulletin X–273, "Properties of DuPont Industrial Filament Yarns", Apr. 1993, pp. 3–5.

* cited by examiner

*Primary Examiner*—Anthony Knight
*Assistant Examiner*—Vishal Patel
(74) *Attorney, Agent, or Firm*—Enrique Abarca; Donald Ingraham

(57) ABSTRACT

A brush seal for reducing leakage of a fluid across a pressure drop in a machine. The brush seal includes a bristle holder attachable to the machine and filament-yarn bristles secured to the bristle holder. In one example the bristles are filaments of an aramid filament yarn, and the machine is a hydrogen-cooled electric generator.

7 Claims, 2 Drawing Sheets

BRUSH SEAL AND MACHINE HAVING A BRUSH SEAL

This application claims priority of a Provisional Application entitled "High Density Non-Metallic Brush Seals Made of Kevlar Yarns" by Mahmut F. Aksit et al., Ser. No. 60/145,049 filed Jul. 22, 1999.

BACKGROUND OF THE INVENTION

The present invention relates generally to seals, and more particularly to a brush seal and to a machine having a brush seal.

Machines include rotary machines such as turbines for steam turbines and compressors and turbines for gas turbines. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

Annular brush seals have been proposed for use between a rotor and a surrounding casing in gas and steam turbines. The annular brush seal is made up of circumferentially-arrayed brush seal segments. Each brush seal segment is attached to the casing and includes a back (i.e., downstream) plate, a front (i.e., upstream) plate, and bristles which are positioned between the back and front plates with the free end of generally each bristle extending beyond the edges of the back and front plates. The bristles typically are canted at an angle of generally forty-five degrees in the direction of rotation of the rotor, and the free ends of the bristles are close to (and may even touch) the rotor. Typically, the front plate (and in some designs also portions of the back plate), near the free ends of the bristles, is spaced apart from the bristles to allow room for the bristles to flex and recover during transient encounters of the free ends of the bristles with the rotor. Metal wire bristles have been proposed with one end of each bristle being welded between and to the front and back plates. Typically, each bristle has a diameter of between 0.002 inch and 0.008 inch. Typically, there are no more than fifteen rows of bristles between the front and back plates because additional rows would make the brush seal too stiff for proper operation and very difficult to manufacture within desired dimensional tolerances. What is needed is an improved brush seal for a machine.

BRIEF SUMMARY OF THE INVENTION

In a first expression of an embodiment of the invention, a brush seal is for reducing leakage of a fluid across a pressure drop in a machine. The brush seal includes a bristle holder attachable to the machine. The brush seal also includes filament yarn bristles secured to the bristle holder. In one construction, the filament yarn is an aramid filament yarn.

In a second expression of an embodiment of the invention, a brush seal is for reducing leakage of a fluid across a pressure drop in a machine. The brush seal includes a bristle holder attachable to the machine. The brush seal also includes yarns, wherein each of the yarns includes filaments, wherein each of the filaments defines a bristle, and wherein each of the bristles is secured to the bristle holder. In one construction, the filaments are aramid filaments.

In a third expression of an embodiment of the invention, a machine includes first and second components, a fluid, and a brush seal. The second component is spaced apart from the first component to define a gap therebetween. The fluid has a pressure drop generally transverse to the gap during machine operation. The brush seal includes a bristle holder attachable to the machine and also includes filament yarn bristles secured to the bristle holder. In one construction, the filament yarn is an aramid filament yarn.

In a fourth expression of an embodiment of the invention, a rotary machine includes a stator, a rotor, a fluid, and a brush seal. The rotor is radially spaced apart from the stator to define a gap therebetween. The fluid has a pressure drop generally transverse to the gap during machine operation. The brush seal includes a bristle holder attachable to the stator. The brush seal also includes yarns, wherein each of the yarns includes filaments, wherein each of the filaments defines a bristle, and wherein each of the bristles is secured to the bristle holder. In one construction, the filaments are aramid filaments.

Several benefits and advantages are derived from the invention. Using aramid filaments for the bristles of a brush seal for a machine results in bristles of smaller diameter resulting in greatly increased bristle packing densities which should significantly reduce leakage. Using a yarn of aramid filaments allows a brush seal of small-diameter bristles to be constructed since it is virtually impossible to handle and secure individual small-diameter aramid filaments to a bristle holder. One example of an aramid filament yarn is a KEVLAR® (trademark of DuPont) aramid filament yarn. It is noted that making known metal wire or ceramic wire bristles of smaller diameter would result in bristles that would easily break during usage.

DETAILED DESCRIPTION OF THE INVENTION

Figure 1:
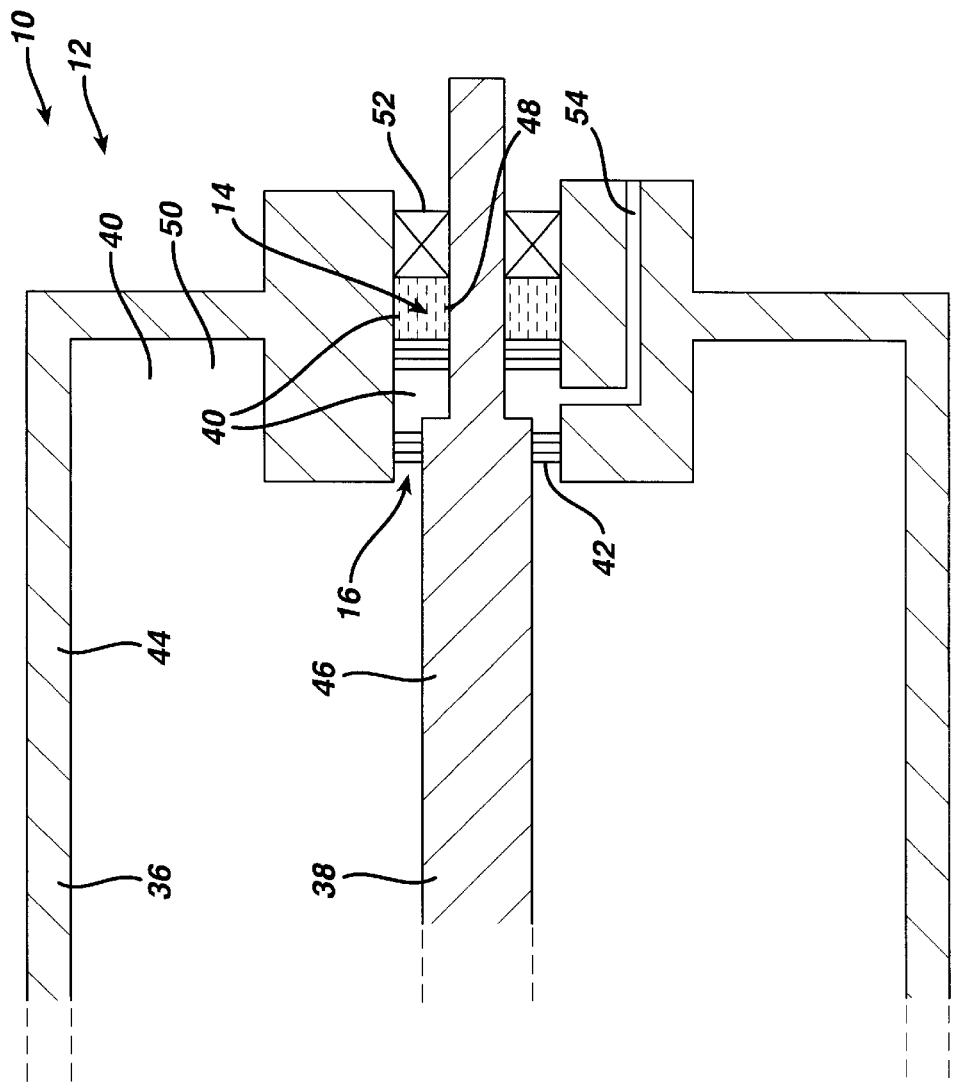
FIG. 1 is a schematic, cross-sectional, side-elevational view of a portion of a hydrogen-cooled electrical generator including two brush seals.
Figure 2:
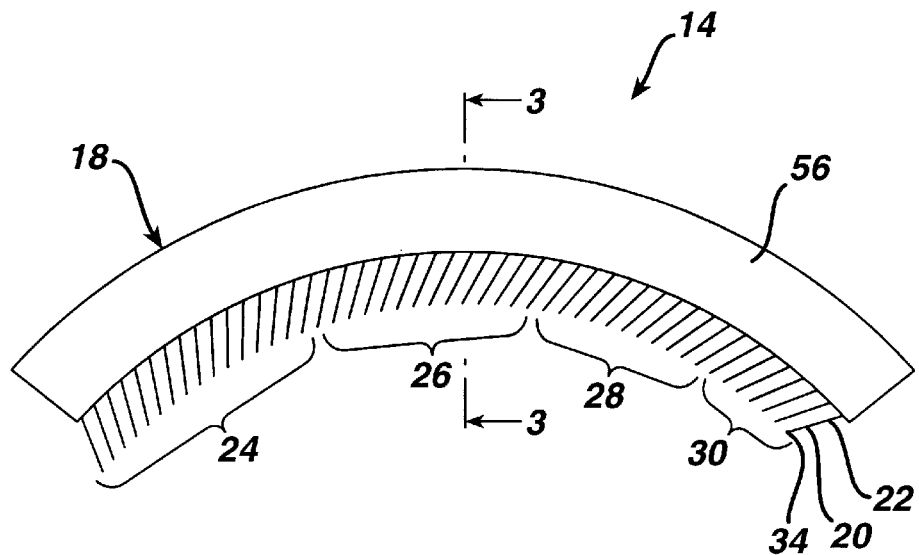
FIG. 2 is a schematic, front-elevational view of a brush seal segment of one of the brush seals of FIG. 1.
Figure 3:
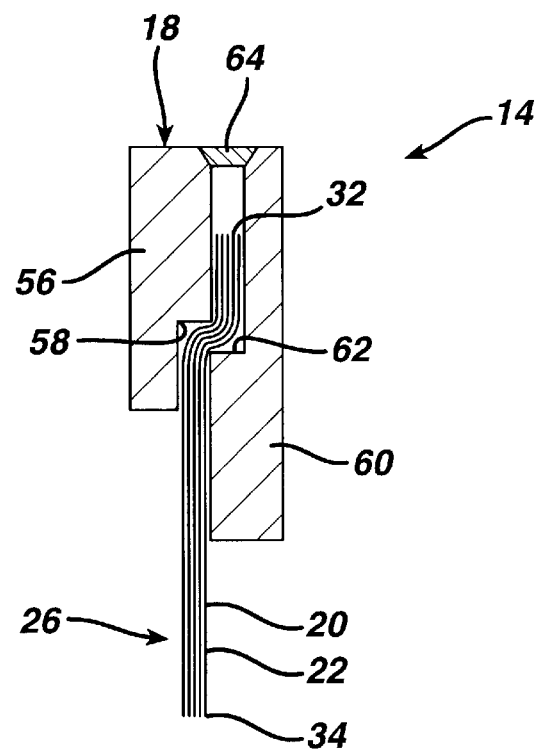
FIG 3 is a view of the brush seal segment of FIG. 2 taken along lines 3—3 of FIG. 2.

Referring now to the drawings, FIG. 1 schematically shows an embodiment of the present invention as a portion of a machine 10 (which is a rotary machine 12) having two brush seals 14 and 16, with one of the brush seals 14 shown in greater detail in FIGS. 2 and 3. It is understood that brush seal 16 is similar or generally identical to brush seal 14, and that the description of brush seal 14 given below serves also as a description of brush seal 16. In one example, as shown in FIG. 1, the rotary machine 12 is an electric generator and specifically a hydrogen-cooled electric generator. In other examples, without limitation, the rotary machine 12 is a centrifugal compressor, a steam turbine (including a turbine portion thereof) used by a power utility company, or a gas turbine (including a compressor portion or a turbine portion thereof) used as an aircraft engine or used by a power utility company. Such other examples have been omitted from the drawings. It is noted that the invention is not limited to an association with a rotary machine and can be associated with any machine experiencing a fluid pressure drop during machine operation. One example, without limitation, of a non-rotary machine is a linearly-reciprocating machine. It is further noted that the invention is not limited to being expressed as a machine and can also be expressed as a brush seal for a machine. The brush seal is not limited to a moving or rotating portion of the machine and can be employed between two components having no relative motion or relative rotation.

A first expression of the embodiment of the invention shown in FIGS. 1–3 is a brush seal 14 for reducing leakage of a fluid across a pressure drop in a machine 10. For purposes of describing the invention, it is understood that the terminology "brush seal" includes, without limitation, a segment of a brush seal when such brush seal is manufactured in segments which are arrayed together to form the complete brush seal. The brush seal 14 includes a bristle holder 18 attachable to the machine 10 and filament-yarn bristles 20 secured to the bristle holder 18. A filament-yarn bristle 20 is defined as a bristle consisting of, or consisting essentially of, a filament 22 supplied to a brush-seal manufacturer together with other filaments 22 in the form of a yarn 24, 26, 28, and 30. Typically, each of the bristles 20 has a diameter of less than 0.001 inch (and in one example has a diameter of generally 0.00056 inch), a yarn 24–30 contains from 1,000 to 2,000 bristles 20, and a brush seal 14 contains between one and hundreds of yarns 24–30. In one construction, the bristles 20 are non-metallic bristles and are filaments 22 of an aramid filament yarn. An exemplary aramid filament yarn is a KEVLAR® (trademark of DuPont) aramid filament yarn. Other examples of filament yarns include, without limitation, nylon, polyester, and fluorocarbon filament yarns. In one design, each of the bristles 20 has a first end 32 and a second end 34, wherein each of the bristles 20 is secured to the bristle holder 18 proximate the first end 32, and wherein the second end 34 is a free end. Typically, the bristles 20 have a packing density of greater than 100,000 filaments per inch (and in one example has a packing density of generally 272,000 filaments per inch).

A second expression of the embodiment of the invention shown in FIGS. 1–3 is a brush seal 14 for reducing leakage of a fluid across a pressure drop in a machine 10. The brush seal 14 includes a bristle holder 18 attachable to the machine 10. The brush seal 14 also includes a plurality of yarns 24–30, wherein each of the yarns 24–30 consists essentially of (or consists of) a multiplicity of filaments 22, wherein each of the filaments 22 defines a bristle 20, and wherein each of the bristles 20 is secured to the bristle holder 18. For purposes of describing the invention, it is understood that the terminology "plurality of yarns" includes, without limitation, a plurality of shorter yarn segments cut from one or more longer yarns. In one application, the brush seal 14 contains at least fifty yarns (only four yarns 24–30 being shown for clarity in FIG. 2). In an exemplary design, each of the filaments 22 consists essentially of, or consists of, an aramid filament such as a KEVLAR® (trademark of DuPont) aramid filament, and each of the yarns 24–30 consists of between 1,000 and 2,000 filaments 22. In this design, each of the filaments 22 has a diameter of less than 0.001 inch, and the filaments 22 have a packing density of greater than 100,000 filaments per inch. For this design, each of the bristles 20 has a first end 32 and a second end 34, wherein each of the bristles 20 is secured to the bristle holder 18 proximate the first end 32, and wherein the second end 34 is a free end.

In a third expression of the invention shown in FIGS. 1–3, a machine 10 includes a first component 36, a second component 38, a fluid 40, and a brush seal 14. The second component 38 is spaced apart from the first component 36 to define a gap 42 between the first and second components 36 and 38. The fluid 40 is in fluid communication with the gap 42, wherein the fluid 40 has a pressure drop generally transverse to the gap 42, and wherein the pressure drop is generated during operation of the machine 10. It is noted that the pressure drop can be generated by the machine itself or can be generated independently of the machine.

The brush seal 14 includes a bristle holder 18 attachable to the machine 10 and filament-yarn bristles 20 secured to the bristle holder 18. A filament-yarn bristle 20 is defined as a bristle consisting of, or consisting essentially of, a filament 22 supplied to a brush-seal manufacturer together with other filaments 22 in the form of a yarn 24, 26, 28, and 30. Typically, each of the bristles 20 has a diameter of less than 0.001 inch, a yarn 24–30 contains from 1,000 to 2,000 bristles 20, and a brush seal 14 contains between one and hundreds of yarns 24–30. In one construction, the bristles 20 are filaments 22 of an aramid filament yarn. An exemplary aramid filament yarn is a KEVLAR® (trademark of DuPont) aramid filament yarn. Other examples of filament yarns include, without limitation, nylon, polyester, and fluorocarbon filament yarns. In one design, each of the bristles 20 has a first end 32 and a second end 34, wherein each of the bristles 20 is secured to the bristle holder 18 proximate the first end 32, and wherein the second end 34 is a free end. Typically, the bristles 20 have a packing density of greater than 100,000 filaments per inch.

In a fourth expression of the invention shown in FIGS. 1–3, a rotary machine 12 includes a stator 44, a rotor 46, a fluid 40, and a brush seal 14. The rotor 46 is generally coaxially aligned with the stator 44 and is radially spaced apart from the stator 44 to define a gap 42 between the stator 44 and the rotor 46. Typically, the stator 44 circumferentially surrounds the rotor 46, as seen in FIG. 1, but certain applications require the rotor to circumferentially surround the stator, as is known to those skilled in the art. The fluid 40 is disposed in the gap 42, wherein the fluid 40 has a pressure drop generally transverse to the gap 42, and wherein the pressure drop is generated during operation of the machine 10.

The brush seal 14 includes a bristle holder 18 attachable to the stators 44 of the rotary machine 12. The brush seal 14 also includes a plurality of yarns 24–30, wherein each of the yarns 24–30 consists essentially of (or consists of) a multiplicity of filaments 22, wherein each of the filaments 22 defines a bristle 20, and wherein each of the bristles 20 is secured to the bristle holder 18. In one application, the brush seal 14 contains at least fifty yarns (only four yarns 24–30 being shown for clarity in FIG. 2). In an exemplary design, each of the filaments 22 consists essentially of, or consists of, an aramid filament such as a KEVLAR® (trademark of DuPont) aramid filament, and each of the yarns 24–30 consists of between 1,000 and 2,000 filaments 22. In this design, each of the filaments 22 has a diameter of less than 0.001 inch, and the filaments 22 have a packing density of greater than 100,000 filaments per inch. For this design, each of the bristles 20 has a first end 32 and a second end 34, wherein each of the bristles 20 is secured to the bristle holder 18 proximate the first end 32, and wherein the second end 34 is a free end which extends generally towards the rotor 46. The second end 34 is disposed proximate the rotor 46, and in some applications is disposed to just touch the rotor 46. Typically, the bristles 20 are canted at an angle, such as the generally forty-five degree angle shown in FIG. 2, with such canting being known to the artisan, to minimize interference with the rotor 46 if the rotor 46 is imagined as present and rotating counterclockwise in FIG. 2.

In one design, the stator 44 is an electric-generator stator, and the rotor 46 is an electric-generator rotor. Here, brush seal 14 is for reducing the leakage of a fluid 40 which is liquid oil 48. In a particular refinement of this design, the stator 44 is a hydrogen-cooled electric-generator stator, and the rotor 46 is a hydrogen-cooled electric-generator rotor. Here, brush seal 16 (the other brush seal shown in FIG. 1) is for reducing the leakage of a fluid 40 which is gaseous hydrogen 50. A rotary machine 12 which is a hydrogen-cooled electric generator has pressurized gaseous hydrogen 50 present for cooling purposes in that portion of the gap 42 which is to the left of brush seal 16 as viewed in FIG. 1. The pressure drop of the gaseous hydrogen 50 is from left to right across brush seal 16 as viewed in FIG. 1. To prevent any gaseous hydrogen 50 which leaks past brush seal 16 from leaking out of the rotary machine 12, a more highly-pressurized liquid oil 48 is introduced (at an entry point not visible in FIG. 1) in that portion of the gap 42 which is between brush seal 14 and bearing 52. The pressure drop of the liquid oil 48 is from right to left across brush seal 14 as viewed in FIG. 1. Any leaked gaseous hydrogen and liquid oil is extracted from the rotary machine 12 through conduit 54, is separated (not shown), and recycled back into the rotary machine 12. Brush seals 14 and/or 16 can be used in other applications such as, without limitation, in a gap between a stator and a rotor (including a tip of a rotor blade) of any compressor and/or turbine portion of an aircraft gas turbine engine or any turbine portion of a steam turbine or any compressor and/or turbine portion of a gas turbine of a power utility company.

One method for making Applicants' brush seal 10, with its filament-yarn bristles 20, includes cutting a long yarn into shorter, equal-sized yarns (which can also be referred to as yarn segments), wrapping the yarns around a core wire, and clamping the wrapped yarns. Another method includes clamping the yarns between a front plate and a back plate of a bristle holder and then using a high temperature epoxy or other adhesive to join together the yarns and the front and back plates. An exemplary method, whose results are shown in FIGS. 2–3, includes obtaining a weldable front plate 56 of a bristle holder 18 having a step 58, obtaining a weldable back plate 60 of a bristle holder 18 having a step 62 matching the step 58 of the front plate 56, clamping the yarns 24–30 between the matched steps 62 and 58, and welding the front and back plates 56 and 60 together, wherein the weldment 64 is spaced apart from the first ends 32 of the bristles 20.

Several benefits and advantages are derived from the invention. Using aramid filaments for the bristles 20 of a brush seal 14 for a machine 10 results in bristles 20 of smaller diameter resulting in greatly increased bristle packing densities which should significantly reduce leakage. Using a yarn 24–30 of filaments 22 (such as aramid filaments) allows a brush seal 14 of small-diameter bristles 20 to be constructed since it is virtually impossible to handle and secure individual small-diameter aramid filaments to a bristle holder 18. One example of an aramid filament yarn is a KEVLAR® (trademark of DuPont) aramid filament yarn. It is noted that making known metal wire or ceramic wire bristles of smaller diameter would result in bristles that would easily break during usage. When the machine 10 is a rotary machine 12, and the rotary machine 12 is a hydrogen-cooled electric generator, having smaller diameter bristles results in higher bristle packing densities which should reduce the capillary effect of large diameter bristles to wick the liquid oil across brush seal 16 instead of having that brush seal reduce fluid leakage. It is noted that there is no capillary effect for a gaseous fluid because of the gas turbulence effect which impedes the fluid leakage, as can be appreciated by those skilled in the art. Other benefits include Applicants' bristles being non electrical conductors so that Applicants' brush seal does not require the electrical insulation needed by conventional metal-wire brush seals to insulate them from the stator to prevent unwanted electrical discharge between the rotor and the stator of an electric generator. Applicants' brush seal should save generally one-third the cost of a conventional metal-wire brush seals.

Applicants conducted experiments in a test rig to simulate conditions in an electric generator with the fluid being only oil. The distance between the front plate and the free ends of the bristles was generally 0.300 inch, the distance between the back plate and the free ends of the bristles was 0.030 inch, and the distance between the front and back plates was 0.110 inch. Static test results showed Applicants' brush seal having KEVLAR® (trademark of DuPont) aramid-yarn bristles reduced leakage more than fifty percent compared to a conventional highly-packed metal-bristle brush seal. Preliminary dynamic (i.e., rotating) test results showed Applicants' brush seal having twice the leakage of the conventional brush seal because Applicants' brush seal was made without adequate bristle stiffness wherein such bristles suffered hydrodynamic lift-off. Engineering analysis indicates hydrodynamic lift-off is a problem in a liquid (such as oil) but is not a problem in a gas (such as air), and without hydrodynamic lift-off, dynamic seal behavior should approach static seal behavior. Therefore, it is expected that leakage of a stiffer Applicants' brush seal in oil should be only half the leakage of the conventional brush seal. Applicants plan to dynamically retest their brush seal in oil after increasing bristle stiffness by reducing the distance between the front plate and the free ends of the bristles and/or by increasing the thickness of the brush seal by adding more bristles by increasing the distance between the front and back plates. Applicants also plan static and dynamic tests of their brush seal in air wherein engineering analysis predicts reduced static and dynamic leakage over conventional brush seals.

The foregoing description of several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A turbine for use in a power generation system, said turbine comprising:
    a) a stator;
    b) a rotor generally coaxially aligned with said stator and radially spaced apart from said stator to define a gap between said stator and said rotor; and
    c) a brush seal comprising
        a) a bristle holder attachable to said stator; and
        b) a plurality of yarns, each of said yarns consisting essentially of a multiplicity of filaments, each of said filaments defining a bristle, each of said bristles consisting essentially of an aramid filament and secured to said bristle holder,
            wherein each of said bristles has a diameter of less than 0.001 inch, said bristles having a packing density of greater than 100,000 filaments per inch, and wherein said brush seal reduces leakage of a fluid across a pressure drop in said turbine, said fluid disposed in said gap and having said pressure drop generally transverse to said gap, said pressure drop generated during operation of said turbine.

2. The turbine of claim 1, wherein said turbine is selected from the group consisting of steam turbines and gas turbines.

3. The turbine of claim 1, wherein each of said bristles has a first end and a second end, wherein each of said bristles is secured to said bristle holder proximate said first end, and wherein said second end extends generally towards said rotor.

4. An electric generator for use in a power generation system, said electric generator comprising:
  a) a stator;
  b) a rotor generally coaxially aligned with said stator and radially spaced apart from said stator to define a gap between said stator and said rotor; and
  c) a brush seal comprising
    a) a bristle holder attachable to said stator; and
    b) a plurality of yarns, each of said yarns consisting essentially of a multiplicity of filaments, each of said filaments defining a bristle, each of said bristles consisting essentially of an aramid filament and secured to said bristle holder,
      wherein each of said bristles has a diameter of less than 0.001 inch, said bristles having a packing density of greater than 100,000 filaments per inch, and wherein said brush seal reduces leakage of a fluid across a pressure drop in said electric generator, said fluid disposed in said gap and having said pressure drop generally transverse to said gap, said pressure drop generated during operation of said electric generator.

5. The electric generator of claim 4, wherein each of said bristles has a first end and a second end, wherein each of said bristles is secured to said bristle holder proximate said first end, and wherein said second end extends generally towards said rotor.

6. A turbine for use in an aircraft engine, said turbine comprising:
  a) a stator;
  b) a rotor generally coaxially aligned with said stator and radially spaced apart from said stator to define a gap between said stator and said rotor; and
  c) a brush seal comprising
    a) a bristle holder attachable to said stator; and
    b) a plurality of yarns, each of said yarns consisting essentially of a multiplicity of filaments, each of said filaments defining a bristle, each of said bristles consisting essentially of an aramid filament and secured to said bristle holder,
      wherein each of said bristles has a diameter of less than 0.001 inch, said bristles having a packing density of greater than 100,000 filaments per inch, and wherein said brush seal reduces leakage of a fluid across a pressure drop in said turbine, said fluid disposed in said gap and having said pressure drop generally transverse to said gap, said pressure drop generated during operation of said turbine.

7. The turbine of claim 6, wherein each of said bristles has a first end and a second end, wherein each of said bristles is secured to said bristle holder proximate said first end, and wherein said second end extends generally towards said rotor.

* * * * *

UNITED STATES PATENT AND TRADEMARK OFFICE
CERTIFICATE OF CORRECTION

PATENT NO. : 6,406,027 B1
DATED : June 18, 2002
INVENTOR(S) : Mahmut Faruk Aksit et al.

It is certified that error appears in the above-identified patent and that said Letters Patent is hereby corrected as shown below:

<u>Title page,</u>
Item [75], please add the following Inventor,-- Nitin Bhate, -- to above patent.

Signed and Sealed this

Fifteenth Day of October, 2002

Attest:

Attesting Officer

JAMES E. ROGAN
*Director of the United States Patent and Trademark Office*